Oct. 3, 1961 H. L. SHORTT ET AL 3,002,260

PRINTED CIRCUIT COMPONENT AND A METHOD OF MANUFACTURING SAME

Filed Jan. 30, 1956 3 Sheets-Sheet 1

INVENTORS
HUBERT L. SHORTT
JOHN B. LANGTON
BY Hane and Nydick
ATTORNEYS

INVENTORS
HUBERT L. SHORTT
JOHN B. LANGTON
BY
Haus and Nydick
ATTORNEYS

Oct. 3, 1961 H. L. SHORTT ET AL 3,002,260
PRINTED CIRCUIT COMPONENT AND A METHOD
OF MANUFACTURING SAME
Filed Jan. 30, 1956 3 Sheets-Sheet 3

INVENTORS
HUBERT L. SHORTT
JOHN B. LANGTON
BY
Kane and Nydick
ATTORNEYS

United States Patent Office 3,002,260

Patented Oct. 3, 1961

3,002,260

PRINTED CIRCUIT COMPONENT AND A METHOD OF MANUFACTURING SAME

Hubert L. Shortt and John B. Langton, Tarrytown, N.Y., assignors to Technograph Printed Electronics Inc., Tarrytown, N.Y.

Filed Jan. 30, 1956, Ser. No. 562,225
6 Claims. (Cl. 29—155.5)

The present invention relates to a method of assembling electric coils or windings comprised of several layers in superimposition and to the design of coil or winding layers suitable for assembly by the method of the invention. More particularly, the invention relates to a method of assembling electric multiple layer coils or windings, the component layer windings of which are adhered to strips of pliable insulation material in form of identically repeating longitudinally spaced patterns of substantially flat spiral windings grouped in pairs. The outer ends of the paired windings are connected and the inner ends of all the windings on each strip are symmetrically positioned on the respective insulation backing to form terminals which may be conveniently interconnected through the insulation backing. The multi-layer coils or windings are assembled by superimposing and folding several strips bearing the winding patterns and by interconnecting the inner terminals of the superimposed windings. The winding patterns are generally and preferably produced on the strips by printed circuits techniques.

A method of assembling multiple layer coils or windings by folding and/or superimposing pliable insulation strips bearing flat winding patterns is described in Patent 2,666,254 to Paul Eisler.

One of the objects of the present invention is to provide a novel method which carries forward the principle of said Patent 2,666,254 in that it permits to form a desired number of superimposed layers without causing an appreciable bulking of the material along the sides of the stack of windings at which the individual fold lines of the strips are situated. The formation of a substantial bulk along these sides not only increases the overall dimensions of the finished product which is undesirable in crowded apparatus, but it also makes it more difficult from layer to layer to place the layers or more specifically the windings thereon in accurately superimposed registry which is essential to interconnect the windings on the several layers.

Another object of the invention is to provide a novel and improved method of interleaving the pattern bearing strips with insulation strips separating windings facing each other directly without materially increasing the bulking along the sides of the stack.

Still another object is to provide a novel and improved method of producing transformer coils by folding two strips one bearing the primary winding pattern and the other the secondary winding pattern, both preferably formed by printed circuit techniques, and transversely interleaving an insulation strip while avoiding undue bulkiness of the stack resulting in a distortion of the relative positions of the windings in the stack, by distributing the fold lines on several sides of the stack.

A further object of the invention, allied with the preceding ones, is to provide a novel and improved disposition of the winding patterns on the strips such that windings on the individual layers will readily align themselves in exact superimposed registry when the strips are folded thereby greatly facilitating the interconnection of the windings on each strip for instance, to form the primary and the secondary of a transformer.

Still another object of the invention is to provide a novel and improved disposition of the winding pattern which permits to form a variety of circuit systems. For instance, a single primary winding may be associated with several secondary windings.

Other and further objects, features and advantages of the invention will be pointed out hereinafter and set forth in the appended claims forming part of the application.

In the accompanying drawing several preferred embodiments of the invention are shown by way of illustration and not by way of limitation.

Figure 1:
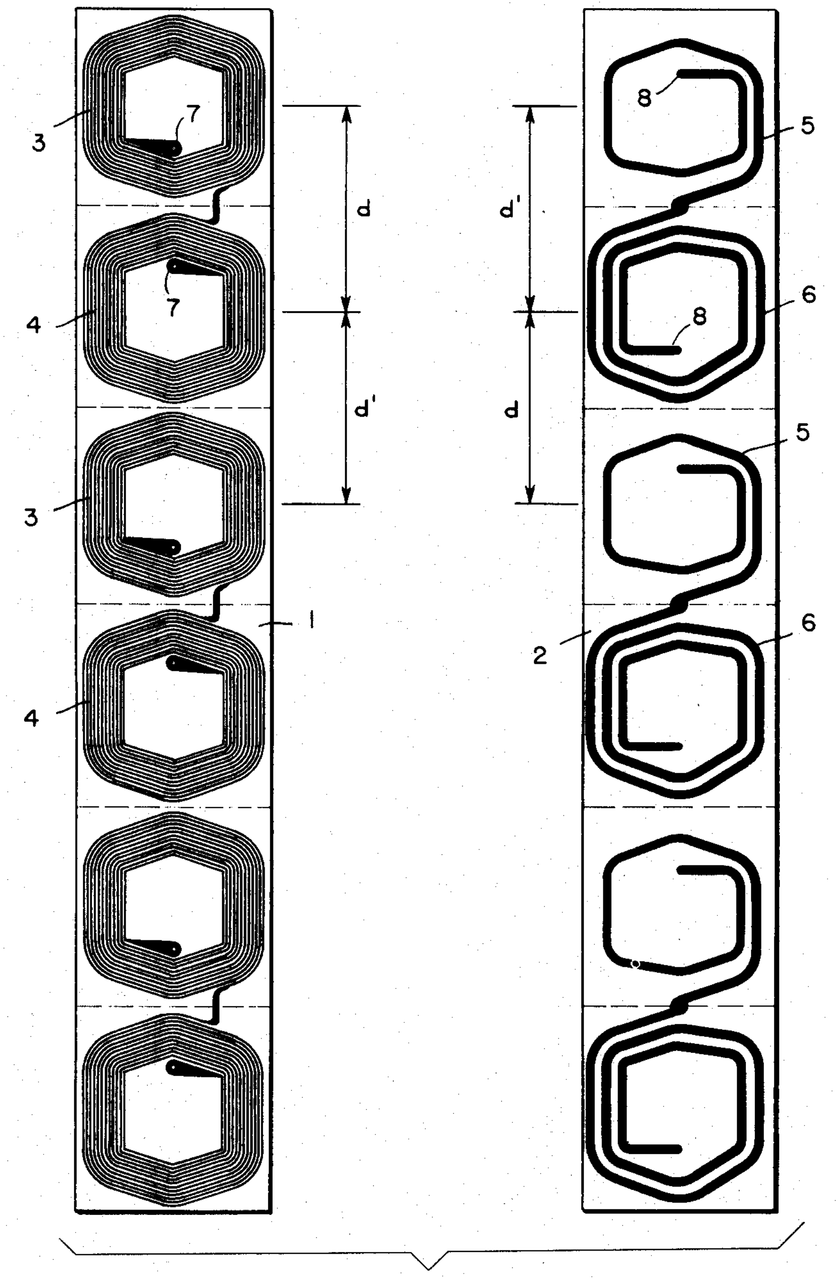
FIG. 1 is a plan view of two insulation strips and the winding patterns adhered thereto.
Figure 2:
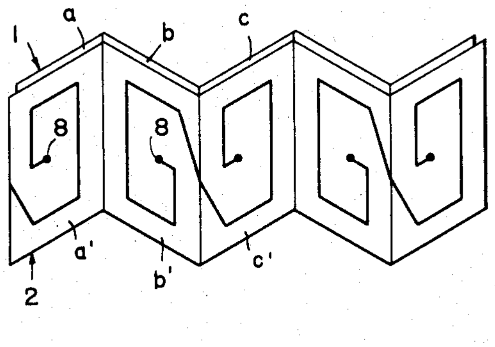
FIG. 2 is an isometric diagrammatic view of the two strips in superimposed and partly folded position.
Figure 3:
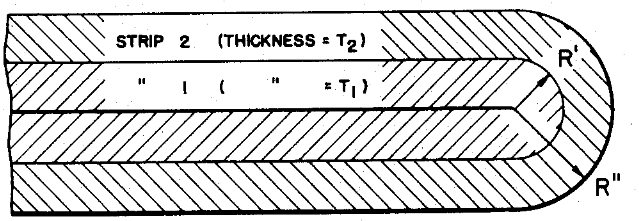
FIG. 3 is a fragmentary sectional view of two strips fully folded.

Referring first to FIGS. 1, 2 and 3, these figures show two continuous strips 1 and 2 made of foldable insulation material such as impregnated paper, fabric or a suitable plastic. Each strip bears an identically repeating pattern of substantially flat conductive spiral windings. The windings are adhered to the insulation backing by any suitable means and are formed on the insulation backing by any suitable method such as printed circuit techniques. The method of and means for forming the winding patterns on the strips do not constitute part of the present invention and a detailed description thereof is not essential for the understanding of the invention.

The windings on each strip are paired by connecting the outer ends thereof. As is apparent, the windings are wound in opposite sense so that each pair forms an S. The windings on strip 1 are generally designated by 3 and 4 and the windings on strip 2 by 5 and 6. The inner ends 7 and 8 respectively of the windings are all placed in alignment so that they will be in superimposed registry when the strips are folded in accordion fashion as will be subsequently described.

The windings on strip 1 may be visualized as constituting the primary winding and the windings on strip 2 as constituting the secondary winding of a transformer. Then, a transformer including the windings on strips 1 and 2 will constitute a step-down transformer. However, as is apparent the principle of the invention applies equally well to a step-up transformer, or any other inductance device employing coil windings.

Let it now be assumed that strip 1 is superimposed upon strip 2 and that the superimposed strips are folded in accordion fashion so that strip 1 is the uppermost one.

As may be readily visualized and is shown in FIG. 2, the first two sections *a* and *b* of strip 1 envelope the first two sections *a'* and *b'* of strip 2 whereas the sections *b* and *c* of strip 1 formed by the second fold line of strip 1 are enveloped by the sections *b'* and *c'* formed by the second fold line of strip 2, etc. As a result, extra strip material must be provided at the fold line of each two outer sections to permit registry of the respective terminals 7 and 8 of the windings. This required extra material depends upon the thickness of the strips and while the strips are generally thin, a failure to provide the required extra material is sufficient to pull the terminals of the windings on the respective outer or enveloping strip sections out of alignment. Furthermore, misalignment of the strips causes bulking and the effect of both, the misalignment and the bulking due to the required extra material is cumulative.

FIG. 3 shows on an exaggerated scale the extra material which is required. Strip 2 is shown as the outer strip and strip 1 as the inner or enveloped strip. Then the formula for the extra material required for folding is:

$$\frac{2R.\pi}{2} \text{ or } R.\pi$$

where R for each strip is:

$R'=T_1$ (thickness of strip 1)
$R''=T_1+T_2$ (thickness of strip 2)

According to the invention the windings on the two strips are laid out in accordance with the aforestated formula so as to provide the required extra material which causes, when the strips are superimposed and subsequently folded in accordion fashion, placement of all the inner terminals 7 and 8 in exact registry along a longitudinal axis through the stack formed by the layers.

As previously mentioned, the design of FIG. 1 presupposes that the strip 1 is superimposed upon strip 2.

While the windings are shown in FIG. 1 as polygonals, it is assumed for the purpose of defining the disposition of the windings that the perimeters of the windings are circular. Under the aforemade assumption, the midpoints of each pair of connected windings on strip 1 are spaced apart by a distance *d* equal to twice the maximum radius of the windings plus at least a distance $(T_2+T_1).\pi$, the maximum radius being the radius of a circle circumscribing the maximum diameter of the windings. The midpoints of the adjacent windings of each pair, that is windings 4 and 3 are separated by a distance *d'* not less than equal to twice the maximum radius of the windings. As may be noted, a small spacing is shown between windings 4 and 3 for the purpose of clarification of the drawing, but this spacing may be disregarded in formulating the aforestated rule as it is not sufficient to affect the accuracy of the alignment.

Similarly, the windings on strip 2 are differently spaced, but on this strip the midpoints of the connected windings of each pair are separated by the distance *d* and the midpoints of the adjacent windings 6 and 5 by the distance *d'* as previously defined.

As a result of the layout of the windings on strips 1 and 2, all terminals 7 and 8 respectively can be brought into perfect alignment when the strips are folded accordion fashion thereby facilitating the interconnection of the terminals.

FIGS. 1 and 2 show that the middle part of each winding is left bare to make space available for the accommodation of the magnetic core material of a transformer or similar circuit component requiring a core.

Figure 4:
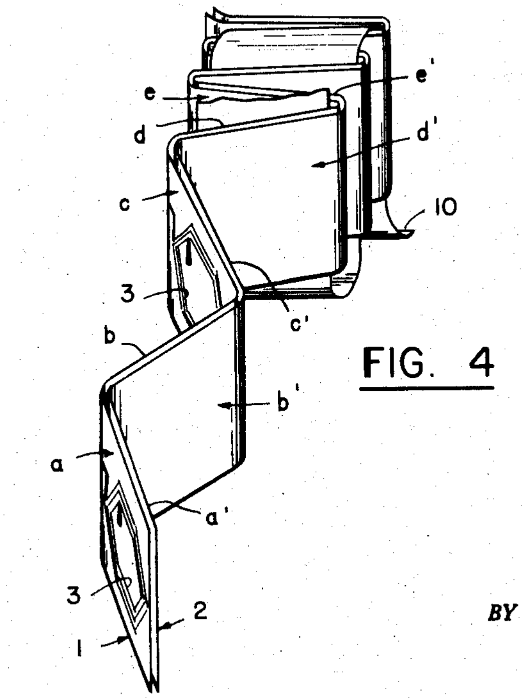
FIG. 4 is an isometric view showing the superimposed and partly folded strips of FIG. 2 and further showing the interleaving of a strip of insulation material.

As is apparent from FIG. 4, the windings 3 and 5 occupy the first panels *a* and *a'* respectively of superimposed strips 1 and 2. All of the windings adhered to strip 2 which lie on panels *a'*, *b'*, *c'*, *d'*, *e'* etc. are insulated from contact with the windings adhered to strip 1 by the insulation material of strip 1. However, the windings adhered to strip 1 lying on panels *b* and *c*, *d* and *e*, etc. face each other directly with no such interposed insulation. As a result, a layer of insulation material must be provided between the windings on panels *b* and *c*, *d* and *e*, etc. According to the invention, the insulation of the windings on the respective panels is effected by the interleaving of a pliable insulation strip 10. This strip is folded accordion fashion transversely of the direction of the strips bearing the windings. As a result, the fold lines of strip 10 are disposed at a 90° angle to the fold lines of strips 1 and 2. This affords the advantage that the fold lines which cause most of the bulking of the stack are distributed upon different sides of the stack so that the total bulking caused by the folding of strips 1, 2 and 10 is reduced to a minimum.

FIGS. 1 and 2 show a primary winding associated with a single secondary winding. For some applications it is desirable to associate a primary winding with several separate and independent secondary windings.

Figure 5:
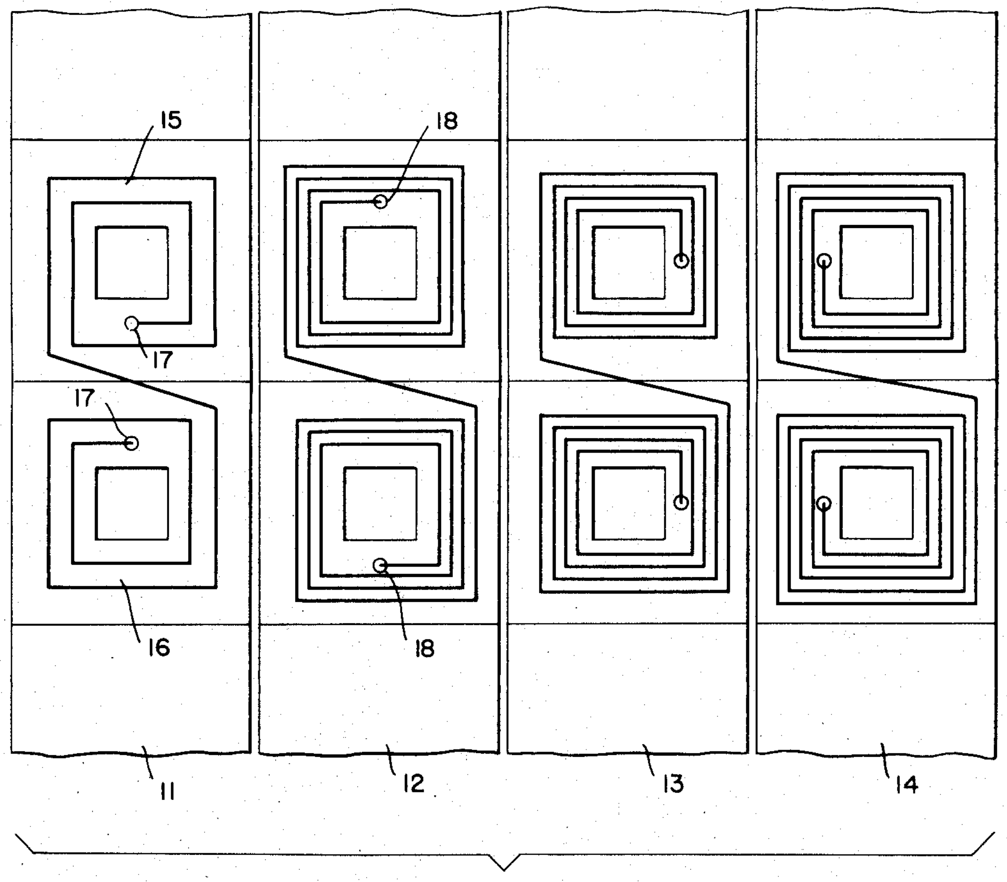
FIG. 5 is a plan view of several strips bearing different winding patterns.

FIG. 5 shows an arrangement in which a single primary winding as shown in FIG. 1 is associated by way of example with four secondary windings. The figure shows four strips 11, 12, 13 and 14. On each strip a single pair of S-shaped windings 15 and 16 is shown, but it should be visualized that the windings form, or at least may form an identically repeating pattern as is shown on strip 2 in FIG. 1. Assuming that strips 11, 12, 13 and 14 are sequentially superimposed, strip 14 being the uppermost one and strip 1 the lowermost one, the aforestated formula of spacing the windings must be applied to assure satisfactory alignment of the inner terminals. According to the formula, the pairs of connected windings on strip 1 are laid out as defined in connection with strip 1 of FIG. 1, and the winding pairs on strip 11 as defined in connection with strip 2 of FIG. 1. As to strip 12, the midpoints of each two windings adhered to strip sections enveloping sections of strips 1 and 11 must be separated by:

*a* distance= twice the maximum radius of the windings plus at least a distance $(T_1+T_{11}+T_{12}).\pi$ where $T_1$ is the thickness of strip 1; $T_{11}$ the thickness of strip 11; and $T_{12}$ the thickness of strip 12.

Each two windings which are folded upon themselves must be separated by a distance at least equal to twice the maximum radius of the windings.

Similarly, the corresponding windings on strip 13 must be separated by a distance equal to twice the maximum radius of the windings plus at least a distance $(T_1+T_{11}+T_{12}+T_{13}).\pi$ where $T_{13}$ is the thickness of strip 13.

Tests have shown that a large number of separate strips may be superimposed and folded without causing undue bulking or misalignment of the inner terminals by applying the aforestated formula of laying out the windings.

FIG. 5 further shows that the inner terminals 17, 18, etc. of the windings on each strip are symmetrically disposed, but in positions different from those on all other strips. This permits a convenient interconnection of the respective terminals when the superimposed strips are folded.

As is evident, in the multiple strip arrangement of FIG. 5 an insulation strip 10 must be transversely interleaved as described in connection with FIG. 4.

It is further possible to superimpose and interleaf strips bearing windings at 90° to other strips bearing windings in the same manner as has been described for the insulation strip 10 of FIG. 4. In such event the layout of the windings on the transverse strip or strips must also be made in accordance with the previously stated formula.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. The method of manufacturing an electrical pathway pattern in form of a multiple layer coil, comprising the steps of forming on one side of a first and a second foldable continuous insulation strip a repeat pattern in the form of a single row of longitudinally spaced identical pairs of substantially flat electrical conductive spiral windings connected with their outer ends, the inner end of each winding on one strip being offset relative to the inner end of each corresponding winding on the other strip the distances between the midpoints of the connected windings of each pair on the first strip and between the midpoints of the adjacent windings of each two pairs on the second strip respectively being equal to a distance approximately twice the maximum radius of the respective windings and the distances between the midpoints of the adjacent windings of each two pairs on the first strip and between the midpoints of the connected windings of each pair on the second strip respectively being at least equal to twice the maximum radius of the respective windings plus a distance $(T_1+T_2).\pi$ wherein $T_1$ is the thickness of one strip and $T_2$ is the thickness of the other strip, superimposing the second strip upon the first strip so that the windings on both strips face the same direction and the windings on one strip are substantially in registry with the windings on the other strip but insulated therefrom, providing a layer of insulation material on the exposed side of the windings on the second strip, folding the superimposed strips in accordion fashion transversely along lines located equidistantly from the inner ends and the midpoints of an adjacent winding on each strip, the transverse fold lines on one strip being formed in registry with the corresponding fold lines on the other strip, perforating the insulation strips and interconnecting the inner ends of all the windings on the first strip and the inner ends of all the windings on the second strip through the perforations in the folded insulation strips.

2. The method of manufacturing an electrical pathway pattern in form of a multiple layer coil, comprising the steps of forming on one side of a first and a second foldable continuous insulation strip a repeat pattern in the form of a single row of longitudinally spaced identical pairs of substantially flat electrical conductive spiral windings connected with their outer ends, the inner end of each winding on one strip being offset relative to the inner end of the corresponding winding on the other strip the two windings of each pair being wound in opposite sense, the distances between the mid-points of the windings of each pair on the first strip and between the midpoints of the adjacent windings of each two pairs on the second strip respectively being equal to a distance approximately twice the maximum radius of the respective windings and the distances between the midpoints of the adjacent windings of each two pairs on the first strip and between the midpoints of the two windings of each pair on the second strip being equal to twice the maximum radius of the respective windings plus at least a distance $(T_1+T_2).\pi$ wherein $T_1$ is the thickness of one strip, and $T_2$ is the thickness of the other strip, superimposing the second strip upon the first strip so that the windings on both strips face the same direction and the windings on one strip are substantially in registry with the windings on the other strip but insulated therefrom, providing a layer of insulation material on the exposed side of the windings on the second strip, folding the superimposed strips in accordion fashion transversely along lines located equidistantly from the inner ends and the midpoints of adjacent windings on each strip, the transverse fold lines of one strip being formed in registry with the corresponding fold lines of the other strip, perforating the insulation strips, and interconnecting the inner ends of all the windings on the first strip and the inner ends of all the windings on the second strip respectively through the perforations in the folded insulation strips to form a continuous first winding wound in the same sense and a continuous second winding respectively wound in the same sense.

3. The method of manufacturing an electrical pathway pattern in form of a multiple layer coil, comprising the steps of forming on one side of a first and a second foldable continuous insulation strip a repeat pattern of a single row of longitudinally spaced identical pairs of substantially flat electrical conductive spiral windings connected with their outer ends, the inner ends of each winding being offset relative to the inner end of the corresponding winding on the other strip, the distances between the midpoints of the windings of each pair on the first strip and between the midpoints of the adjacent windings of each two pairs on the second strip respectively being equal to a distance approximately twice the maximum radius of the respective windings and the distances between the midpoints of the adjacent windings of each two pairs on the first strip and between the midpoints of the windings of each pair on the second strip respectively being equal to twice the maximum radius of the respective windings plus at least a distance $(T_1+T_2).\pi$ wherein $T_1$ is the thickness of one strip and $T_2$ is the thickness of the other strip, superimposing the second strip upon the first strip so that the windings on both strips face the same direction and the windings on one strip are substantially in registry with the windings on the other strip being insulated therefrom, folding the superimposed strips in accordion fashion along lines located equidistantly from the inner ends and the midpoints of adjacent windings on each strip, the transverse fold lines of one strip being formed in registry with the corresponding transverse fold lines of the other strip, interleaving a third foldable continuous insulation strip with said two superimposed strips so that a layer of the third strip is interposed between each two spiral windings facing each other directly thereby electrically insulating said windings, perforating the insulation strips and interconnecting the inner ends of all the windings on the first strip and the inner ends of all the windings on the second strip respectively through the perforations in the folded insulation strips.

4. The method according to claim 3, wherein said third strip is folded in accordion fashion transversely of said superimposed strips.

5. The method according to claim 1, wherein the inner ends of all the windings on the first strip are disposed in alignment with one longitudinal axis through the layers of the folded strips and the inner ends of all the windings on the second strip are disposed in alignment with another longitudinal axis through the layers of the folded strips.

6. An assembly for forming a multiple layer coil, said assembly comprising a first and a second foldable continuous insulation strip, each having one one side a repeat pattern in the form of a single row of longitudinally spaced identical pairs of substantially flat electrically conductive spiral windings connected with their outer ends, adjacent windings being separated by fold lines spaced equidistantly from the respective midpoints, the inner ends of the windings of each pair being located equidistantly from the respective fold line, said ends extending to at least the longitudinal center line of each strip the distances between the midpoints of the connected windings of each pair on the first strip and between the midpoints of the adjacent windings of each two pairs on the second strip respectively being equal to a distance approximately twice the maximum radius of the respective windings and the distances between the midpoints of the adjacent windings of each two pairs on the first strip and between the midpoints of the two windings of each pair on the second strip being equal to twice the maximum radius of the respective windings plus at least a distance $(T_1+T_2).\pi$ wherein $T_1$ is the thickness of one strip and $T_2$ is the thickness of the other strip.

References Cited in the file of this patent

UNITED STATES PATENTS

| | | |
|---|---|---|
| 2,014,524 | Franz | Sept. 17, 1935 |
| 2,441,960 | Eisler | May 25, 1948 |
| 2,548,628 | Sommerville | Apr. 10, 1951 |
| 2,666,254 | Eisler | Jan. 19, 1954 |